July 3, 1934.　　　　　R. MARCON　　　　　1,965,504
APPARATUS FOR THE TREATMENT OF CINEMATOGRAPHIC AND SIMILAR FILMS
Filed July 11, 1933　　　10 Sheets-Sheet 1

Inventor:
René MARCON
by Knowlee
Attorneys

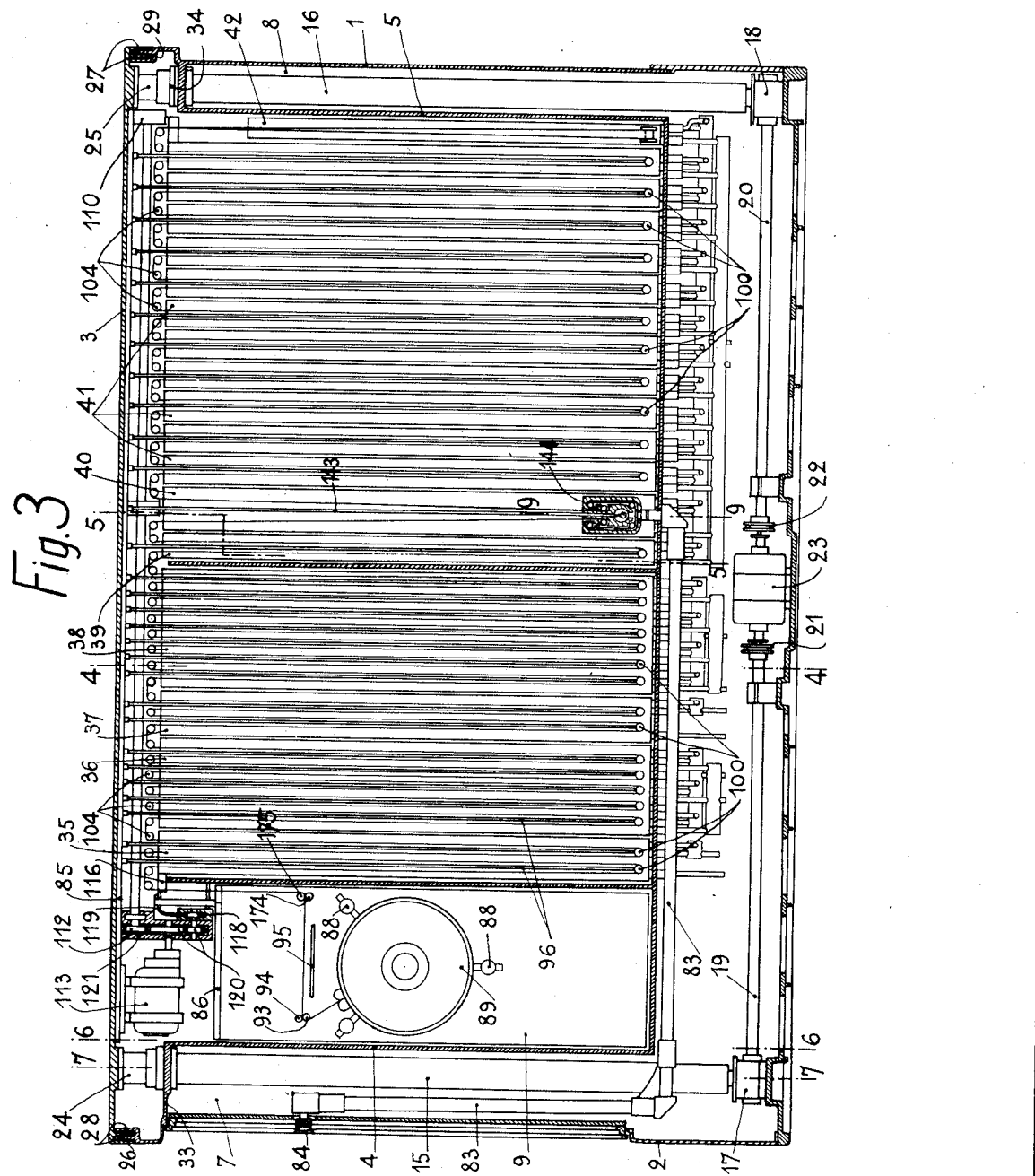

July 3, 1934.    R. MARCON    1,965,504
APPARATUS FOR THE TREATMENT OF CINEMATOGRAPHIC AND SIMILAR FILMS
Filed July 11, 1933    10 Sheets-Sheet 3
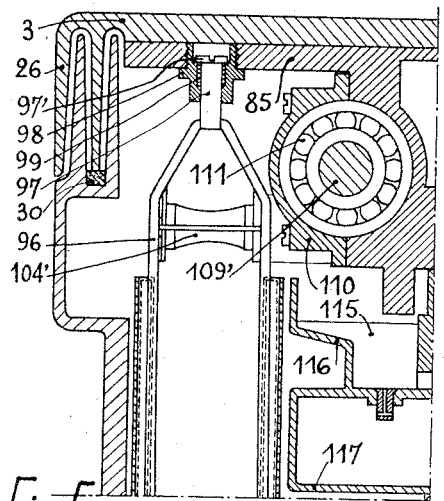
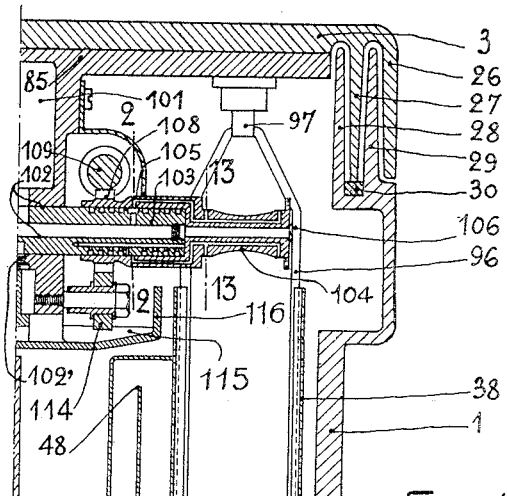
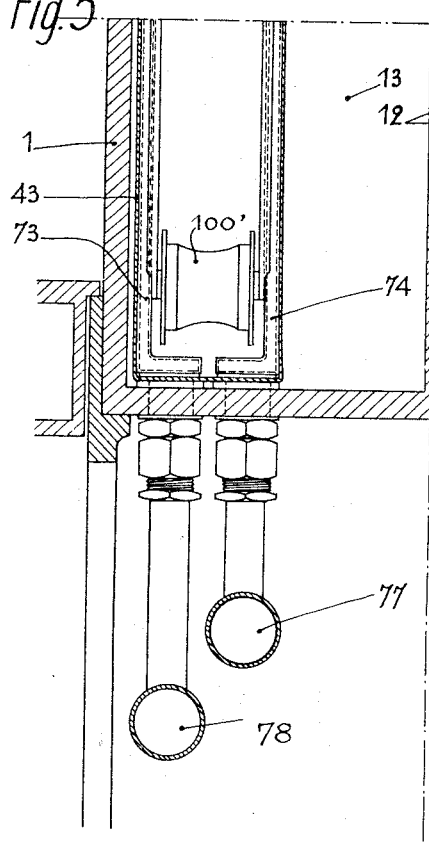
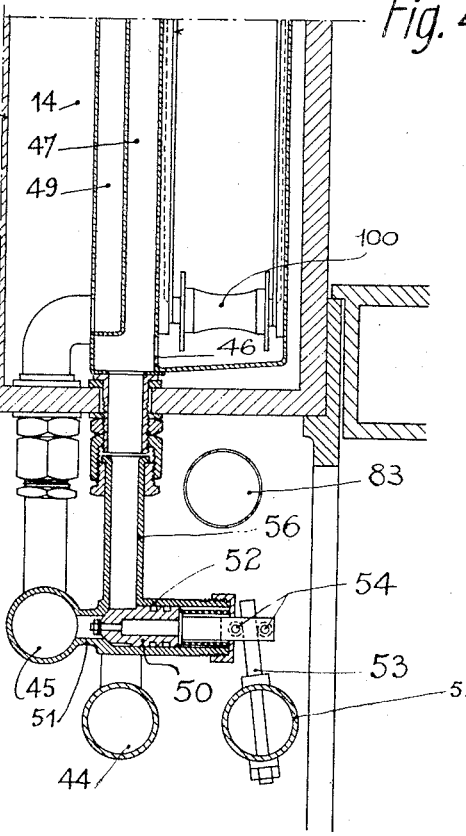
Inventor:
René MARCON
by C.A.Snow & Co.
Attorneys July 3, 1934.                R. MARCON                 1,965,504
APPARATUS FOR THE TREATMENT OF CINEMATOGRAPHIC AND SIMILAR FILMS
                    Filed July 11, 1933        10 Sheets-Sheet 4

Inventor:
René MARCON
by C.A.Snow&Co.
Attorneys

July 3, 1934.　　　　　R. MARCON　　　　　1,965,504
APPARATUS FOR THE TREATMENT OF CINEMATOGRAPHIC AND SIMILAR FILMS
Filed July 11, 1933　　10 Sheets-Sheet 5
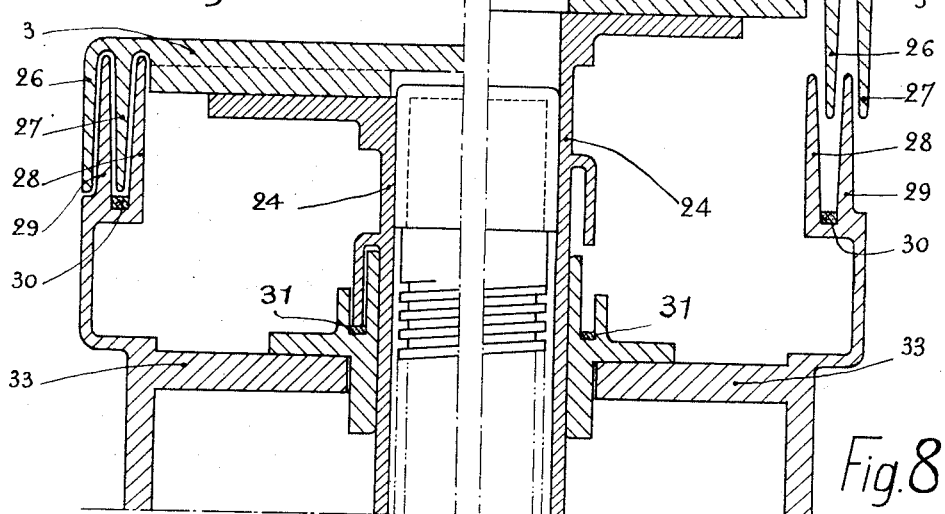
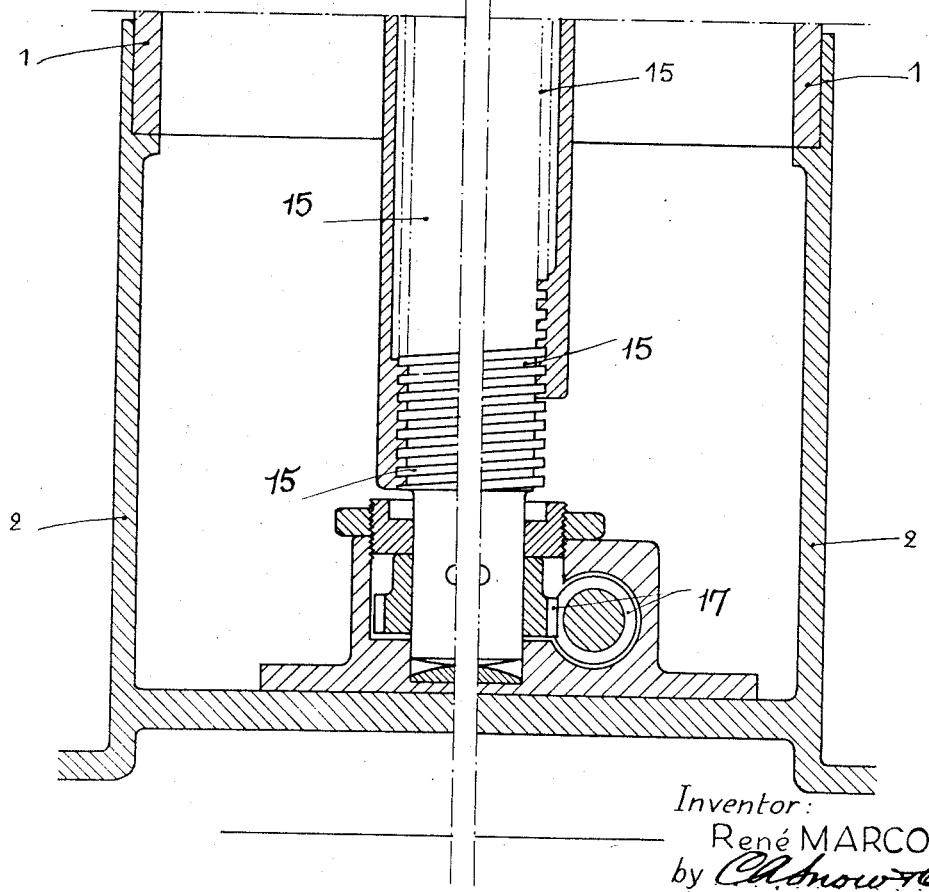
Inventor:
René MARCON
by Ch. Snow & Co.
Attorneys

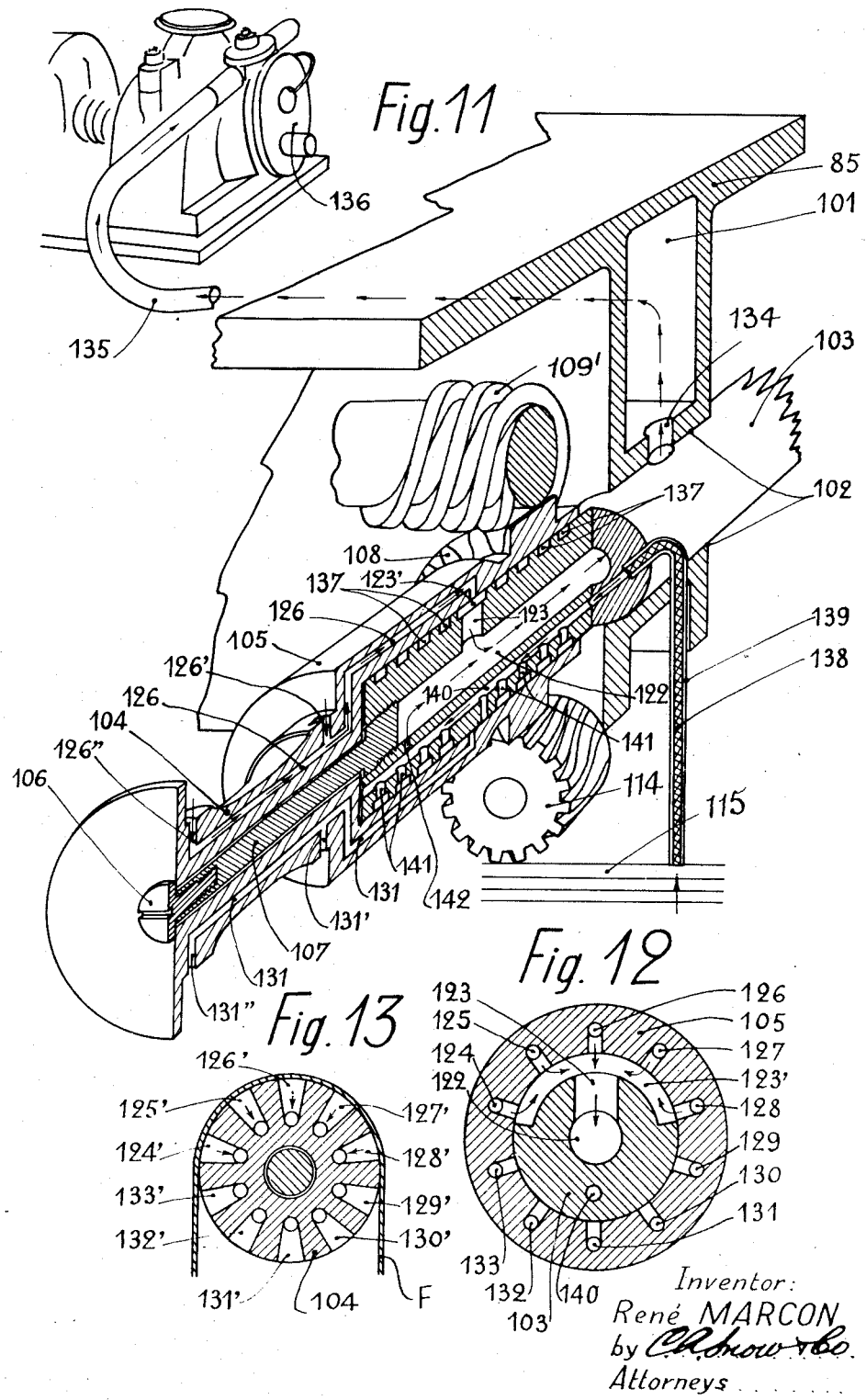

July 3, 1934.    R. MARCON    1,965,504
APPARATUS FOR THE TREATMENT OF CINEMATOGRAPHIC AND SIMILAR FILMS
Filed July 11, 1933    10 Sheets-Sheet 8
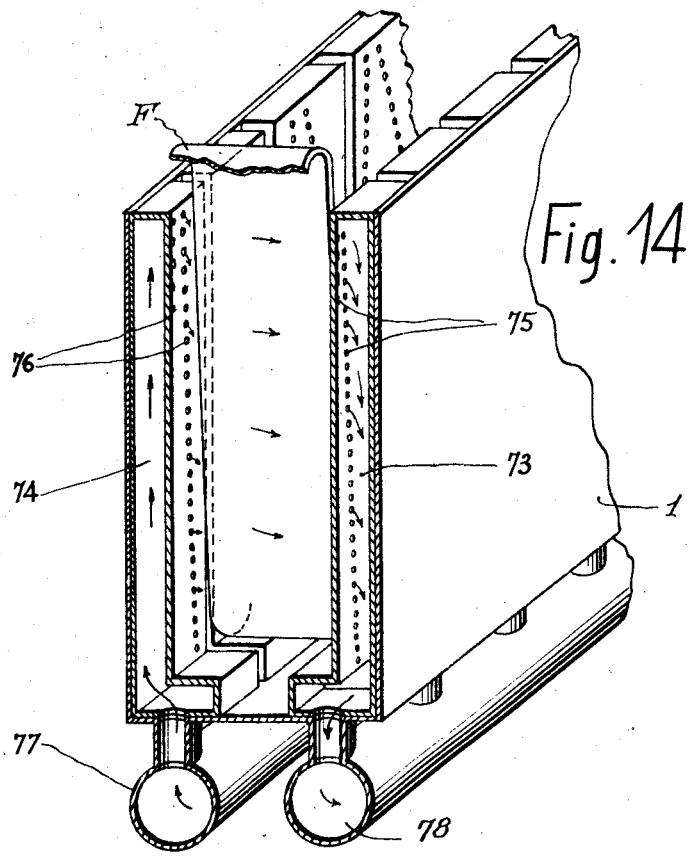
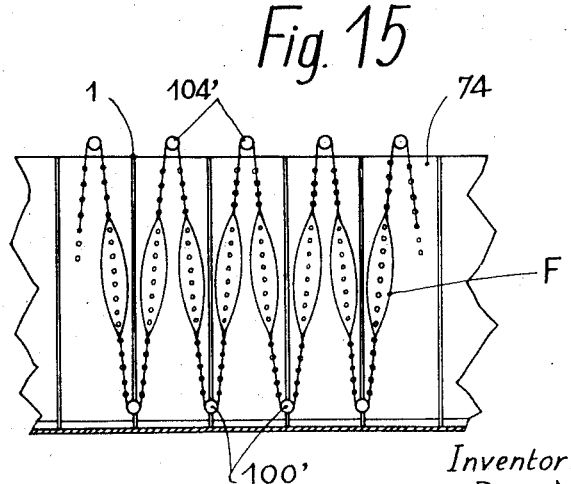
Inventor:
René MARCON
by *[signature]*
Attorneys.

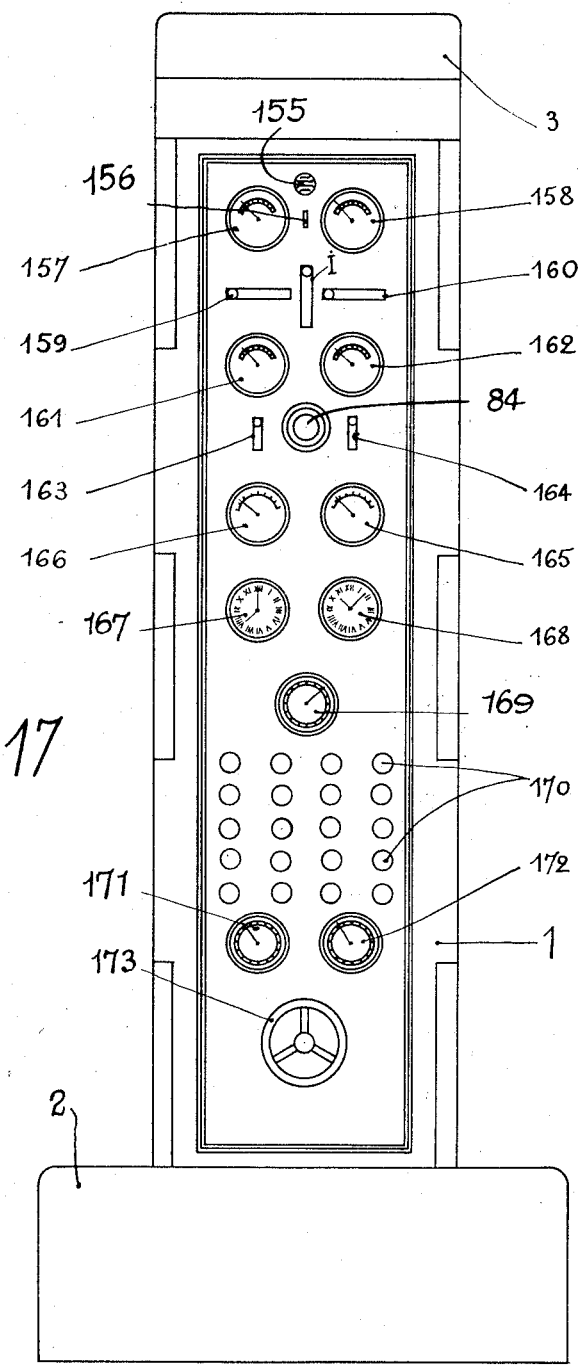

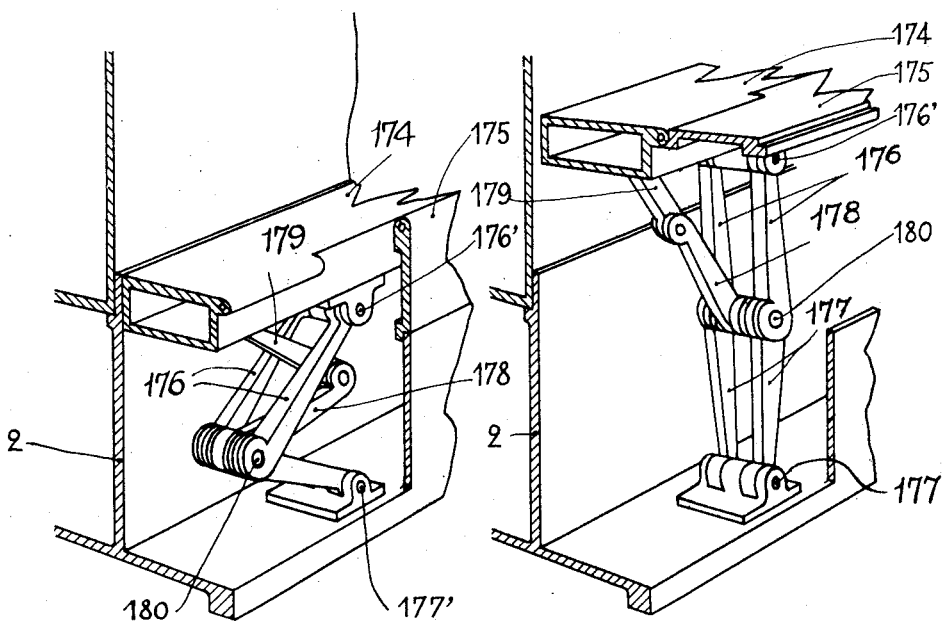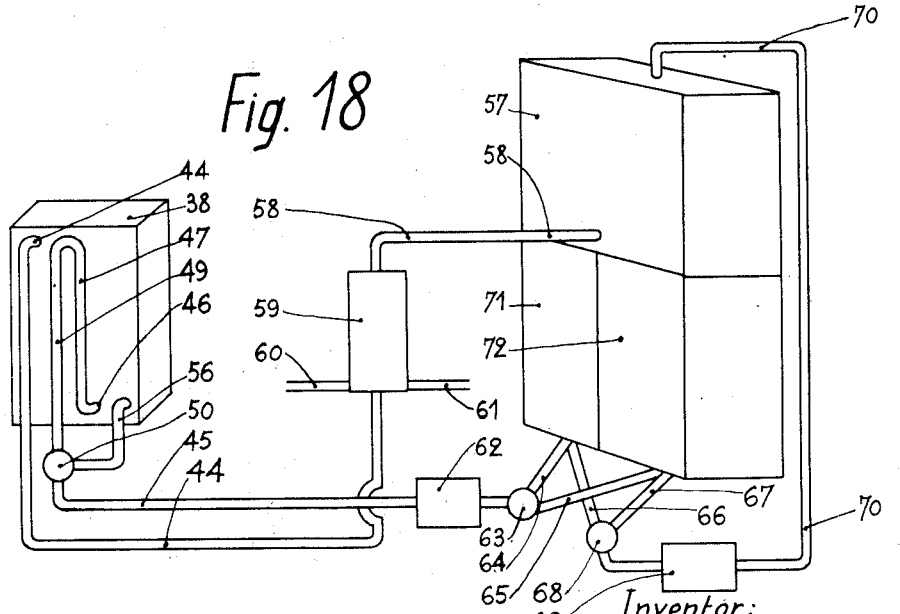

Patented July 3, 1934

1,965,504

UNITED STATES PATENT OFFICE 1,965,504

APPARATUS FOR THE TREATMENT OF CINEMATOGRAPHIC AND SIMILAR FILMS

René Marcon, Paris, France

Application July 11, 1933, Serial No. 679,980
In France April 22, 1933

14 Claims. (Cl. 95—90.5)

The present invention has for its object an apparatus for the treatment of cinematographic and similar films.

The apparatus according to my invention for the complete treatment in a closed vessel of sensitized films is characterized in that it comprises a casing impervious to light and closed by a removable lid in such manner that light cannot leak in. This casing is divided into a plurality of compartments one of which is intended to contain the supports for the reel on which the sensitized film is wound, and for the reel on which the film is to be transferred after treatment. This compartment also comprises the organs for driving the last mentioned reel and the film. Another compartment contains tanks for the treatment of the film. A third compartment is provided with means for drying the film that has been treated.

My invention is further characterized by the following features:

(a) The lid carries the spindles of two sets of pulleys adapted to drive and to guide the film. One of these sets corresponds to the compartment that contains the tanks for the treatment of the film. The other set of pulleys is located in the compartment that contains the organs for drying the film. Each set of pulleys consists of two rows of pulleys, superposed and parallel. The pulleys of the upper row serve to drive the film and are actuated by a suitable driving organ. The pulleys of the lower row are mounted loose on their spindles, which are connected to the lid through supports elastically carried by said lid in such manner that the pulleys of the lower row are immersed in the treating and drying tanks.

(b) Each driving pulley comprises a certain number of suction conduits, the orifices of which are preferably evenly distributed over the cylindrical surfaces that are intended to be in contact with the film, while the orifices at the other ends of the respective conduits, which are preferably evenly distributed, are disposed on a surface of the pulley that is constantly in fluidtight contact with the corresponding surface of a stationary organ in which is provided the orifice of a vacuum pipe connected with a suitable vacuum producing system. Said orifice of the vacuum pipe is of a size and of a shape such that it is, at any time, connected only with those of the conduits of the pulley that are corresponding to the suction orifices that are presently in contact with the film.

(c) Each driving pulley provided with suction orifices and conduits is adapted to revolve in a fluidtight manner on a shaft comprising an inner suction conduit. This conduit opens into a transversal recess located on the periphery of the shaft. The suction conduits of the pulley open into the inner surface thereof at points evenly distributed over said surfaces and opposite the transversal recess provided in the shaft. The transversal width of said recess is so limited that at any time said recess is connected only with those of the suction channels of the pulley the outer orifices of which are in contact with the film.

(d) Each shaft comprises circular grooves the edges of which bear against the corresponding surface of each driving pulley, each groove being connected with an inner longitudinal oil inlet conduit.

(e) The oil inlet conduit is connected on the one hand with a tube inside which is disposed a flexible wick immersed in an oil bath, and, on the other hand with a central suction conduit provided in said shaft through a passage of small cross section.

(f) Each tank for the treatment of the film comprises a liquid inlet pipe connected with a feed tank through a chamber for regulating the temperature, said liquid inlet pipe opening at the upper part of the first mentioned tank, an overflow pipe connected to the lower part of said first mentioned tank and comprising a syphon for maintaining the surface of the liquid in said tank at a suitable level, and a discharge pipe with control means for stopping it.

(g) The overflow pipe and the discharge pipe are connected with a pump provided with means for conveying the liquid from said pump to either of several recuperation tanks, the last mentioned tanks being themselves provided with pipes capable of connecting them eventually with the feed tank so as to return in the circuit the liquids regenerated in said recuperation tanks.

(h) The control means for stopping the discharge pipes of all the tanks or of some of them are operated by a common organ.

(i) One of the tanks for the treatment of the film through circulation of water, is provided at its lower part with a window located opposite a periscopic tube opening on the other side of the casing and provided with means for shutting out light. The removable lid of the casing carries opposite said tank a device adapted to plunge therein and supporting a box capable to fit against said window in such manner as to prevent light from leaking in. The walls of this box are disposed in such manner as to form a passage in which pulleys can be inserted for suitably moving the film past said window. This box comprises an inner fluidtight chamber closed at its lower portion by a translucent screen disposed above the film and the window. An electric bulb the leads of which are mounted in a fluidtight manner is placed in said chamber.

(j) Each drying tank comprises, opposite each edge of the film and on either side of said film, conduits for admitting the drying gas, said conduits being provided with a plurality of holes located opposite said edges. All the conduits located on one side of the film are connected with a blowing device, and all those located on the other side of the film are connected with a suction device.

(k) The removable lid of the casing is supported and actuated by lifting screws, driven by an electric motor disposed in a hollow pedestal that supports the casing.

Preferred embodiments of the present invention will be hereinafter described with reference to the accompanying drawings given merely by way of example, and in which:

Fig. 3 is a vertical sectional view on the line 3—3 of Fig. 2, the lid being in position;

Fig. 4 is a half section seen from the front on the line 4—4 of Fig. 3;

Fig. 5 is a half section seen from the rear on the line 5—5 of Fig. 3;

Figs. 7 and 8 show the lifting system in section on the line 7—7 of Fig. 3, the lid being supposed to be applied against the casing in Fig. 7 and being partly raised in Fig. 8;

Fig. 11 is a perspective view partly in section along an axial plane of a pulley;

Fig. 12 is a cross sectional view of a pulley on the line 12—12 of Fig. 4;

Fig. 13 is a cross sectional view of a pulley on the line 13—13 of Fig. 4;

Fig. 14 is a perspective view showing the perforated conduits disposed in the drying tanks;

Fig. 15 is an elevational view of the same conduits corresponding to another method of conveying the film;

Fig. 17 is an end view of the apparatus according to my invention showing the board that supports the organs for controlling the apparatus;

Fig. 18 is a diagrammatical view showing the hydraulic system;

Figs. 19 and 20 show the platform for visiting the apparatus respectively in its lower and upper position.

Figure 1:
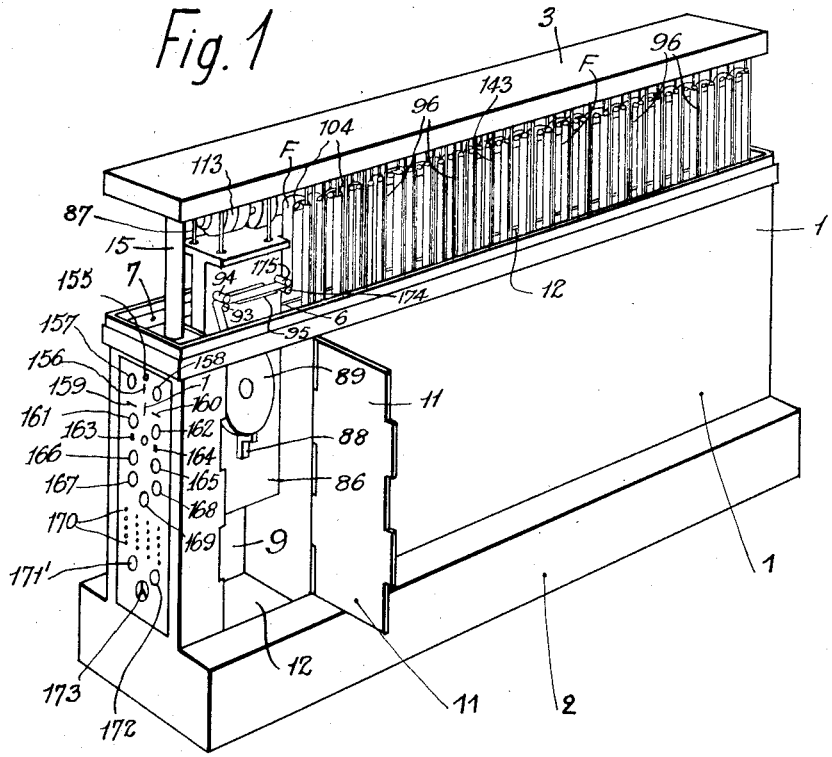
Fig. 1 is a diagrammatic perspective view of the apparatus according to the present invention, the lid being shown partly lifted.

The apparatus for treating cinematographic films that is shown in the appended drawings comprises casing 1 (Figs. 1 and 2), impervious to light, carried by a hollow pedestal 2 and provided with a removable lid 3 adapted to fit on the upper part of said casing in such manner that light cannot leak in. Casing 1 comprises three transversal partitions 4, 5 and 6 forming two end compartments 7 and 8 and a compartment 9 to which access can be obtained through two doors 10 and 11 adapted to be closed in such manner that light cannot leak in, and located in the two opposite walls of the casing respectively. One of these doors 11 is shown open in Fig. 1. The portion of the casing between partitions 5 and 6 is divided by a longitudinal partition 12 into two compartments 13 and 14 of equal volume.

In the end compartments 7 and 8 (Fig. 3), which are open at their lower ends and communicate with the inside of the hollow pedestal 2, and which are closed at their upper ends by bent portions 33, 34 of partitions 4 and 5, there are disposed lifting screws 15 and 16 (Figs. 7 and 8) actuated, through the intermediary of bevelled pinions 17 and 18, by shafts 19 and 20 connected through elastic couplings 21 and 22 to an electric motor 23. This driving system, located in pedestal 2, permits to support and to raise lid 3 through sleeves 24 and 25. Lid 3 supports the whole of the movable organs for the treatment of the film. Lid 3 is provided with two baffles 26 and 27 (Figs. 7 and 8) adapted to engage in corresponding baffles 28 and 29 provided along the upper edge of casing 1, when said lid is applied against the casing. A packing 30 ensures the fluidtightness. A packing 31 also ensures fluidtightness in the central portion of the bent ends 33 and 34 of partitions 4 and 5. It results therefrom that compartments 9, 13 and 14 are closed in a manner that entirely prevents light from leaking in when the lid is applied against the casing. The treatment of the sensitized film is to take place in these compartments.

Figure 2:
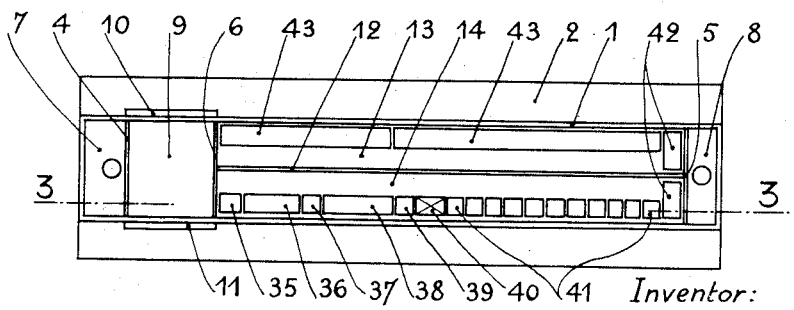
Fig. 2 is a plan view of the apparatus, the lid being removed.

The tanks for treating the film 35, 36, 37, 38, 39, 40, 41 and 42, the number of which may vary, are disposed in compartment 14 (Figs. 2 and 4). These tanks are intended to contain respectively for instance the following baths: tank 35, a desensitizing bath or neutral bath intended to avoid air bubbles in the following active baths; tank 36 a developing bath; tank 37 a stop bath; tank 38 a fixing bath; tank 39 a water bath; tank 40 another water bath in which is disposed the optical apparatus for examining the film that is being treated. Tanks 41 and 42 contain water and permit a perfect washing of the film without saturating with a fixing solution the water in which said film is being moved for freeing it from the salts that it carries on its surface.

The tanks 35 to 41 for the treatment of the film occupy only a portion of the width of compartment 14, as shown in Figs. 2 and 4. The space thus left free forms an air cushion intended to thermally insulate, together with separating partition 12, the two compartments 13 and 14 which are used for drying the film and for treating it by the various baths respectively, these operations taking place at temperatures that are generally different.

These tanks comprise a set of pipes for circulating the bath which is conveyed through conduits 44 to the upper end of each tank (Figs. 4 and 18). The overflow escapes through an outlet orifice 26 provided at the bottom of the tank, flows through a tube 47 the upper end of which is located at the same level as the surface of the liquid in the tank, and is then led through tube 49 to a conduit 45. A valve 50 adapted to slide in a cylindrical sleeve 52 permits of emptying the tank through pipe 56 and tube 45. The operating arm 53 of said valve which is connected thereto through two rollers 54 can be actuated by means of a common control organ 55, which permits the operator at any time to discharge, clean, and then fill all of the tanks.

Fig. 18 diagrammatically shows the operation of the hydraulic system of any one of the tanks for treating the film. Similar devices are utilized for all of the tanks that are necessary for the complete treatment of the cinematographic film. Fresh liquid flows from tank 57 through a pipe 58 leading to a chamber 59 for regulating the temperature. Said chamber 59 is connected at 60 to a source of heat and at 61 to a source of cold. The liquid issuing from said chamber 59 at the desired temperature is conveyed through conduit 44 to the upper part of tank 38. The overflow from tubes 47, 49, or eventually the discharge liquid from pipe 56 is conveyed through valve 50 to a conduit 45. The liquid thus recovered is sent by means of a pump 62 into one of the recuperation tanks 71, 72. A valve 63 makes it possible to direct the liquid from pump 62 into one of the pipes 64, 65 leading to said recuperation tanks respectively. This arrangement of two regeneration tanks permits to recover the liquids that can still be utilized. The used liquids are thrown out. The regenerated liquids coming from either of the two tanks 71, 72, through one of the tubes 66, 67 and through valve 68, are sent by pump 69 into feed tank 57 through pipe 70.

The tank 40 that is intended to contain the optical apparatus for examining the film that is being treated is provided with a hydraulic system analogous to the one that has just been described. This tank 40 has a transparent bottom consisting of a window 79 (Figs. 9 and 10) fitted in the bottom of the tank with suitable packings 80. The upper portion of said window carries an annular flange 81. The reflecting prism 82 of a periscopic tube 83 is located immediately under said window. Said periscopic tube 83 is mounted in pedestal 2 and in compartment 7, and its upper end at 84 where the operator can examine the images of the film without risking to fog the film that is being treated.

In compartment 13 (Figs. 2 and 5) there are disposed a last washing tank 42 and one or several drying tanks 43 (two in the drawings). These last mentioned tanks, same as the tanks for the chemical treatment of the film, occupy only a portion of the width of the compartment 13 in which they are located, in order to form an air cushion opposing thermal exchanges.

These drying tanks (Figs. 2, 5 and 14) comprise several sets of symmetrical conduits 73, 74, suitably spaced (Fig. 14) and provided with respective apertures 75, 76, disposed in the plane of the film F that is passing between them. One of these conduits, 74, is connected with a conduit 77 in which circulates a current of warm air fed by a suitable blower, and adjusted at the desired temperature. The other conduit 73 is connected with a conduit 77 in which there is a certain vacuum created by a suction device. These different conduits which follow the path of the film from the point where it enters the drying tank to the point where it issues therefrom, permit to project on the film, parallelly thereto, a draft of dry air at a moderate temperature which is recovered charged with the humidity of the film, owing to the suction in conduit 78. This system is so adjusted that the atmosphere of the drying tanks is entirely free from moisture, thus providing an efficient drying.

Figure 6:
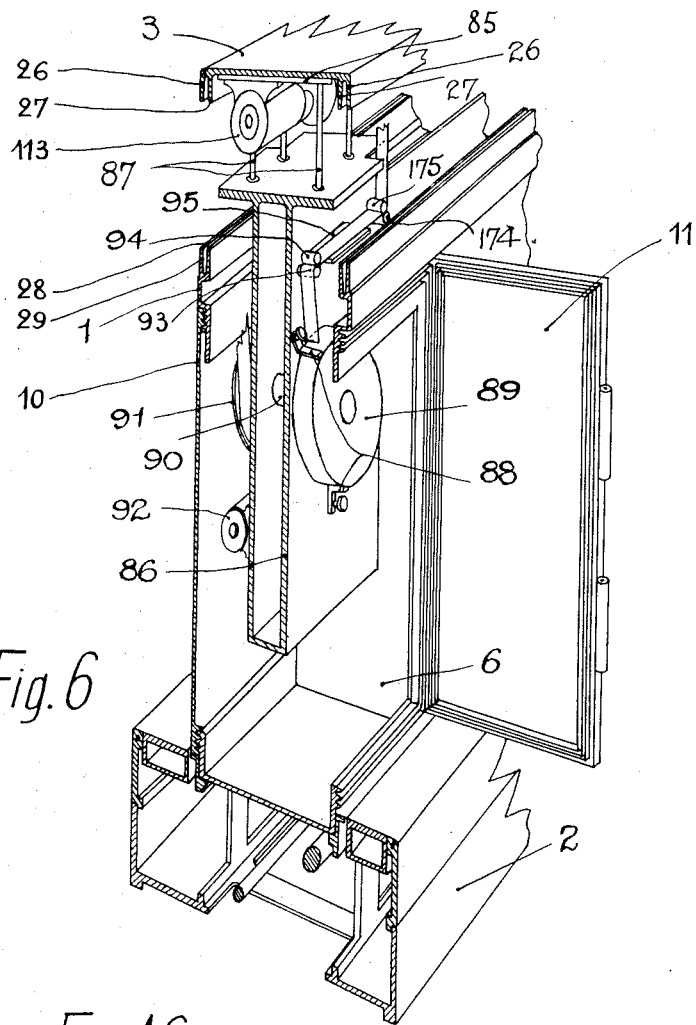
Fig. 6 is a perspective view in section on the line 6—6 of Fig. 3, the lid being removed.
Figure 16:
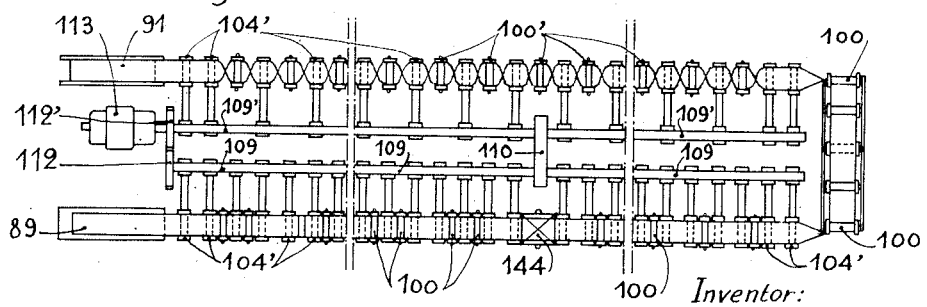
Fig. 16 is a plan view showing in a diagrammatical manner the device for driving the pulleys and conveying the film.

The removable lid 3 is integral with a supporting plate 85 running along nearly the whole length of said lid, and above compartments 9, 13 and 14 of casing 1. This plate carries, through rods 87, a support 86 of T-shaped cross section, the vertical branch of the T being hollow (Figs. 3 and 6). The dimensions of said support 86 are such that its vertical sides fit against the walls of compartment 9 which is thus divided longitudinally into two compartments. Support 86 carries jaws 88 intended to fix the magazine 89 that contains the film to be treated. On the other side support 86 carries a spindle 90 on which is mounted loose the reel 91 on which is to be wound the treated film. The last mentioned reel is for instance driven by a motor 92 carried by support 86. Plate 85 (Figs. 3, 4, 5 and 16) carries two symmetrical rows of stirrups 96 suitably spaced from one another, and the upper part 97 of which comprises a head 97' sliding in a socket 98 screwed in plate 85. A spiral spring 99 is interposed between said head 97' and the bottom of socket 98. Each of these stirrups carries at its lower end a pulley 100, 100' mounted loose thereon. The length of said stirrup is such that when lid 3 is closed, said pulleys 100, 100' are located at the lower part of the tanks as shown in Figs. 4 and 5. The elastic suspension of the stirrups allows them to oscillate slightly in a vertical direction so as to suitably stretch the film and to follow any slight variations of tension that may take place.

Supporting plate 85 is so made (Figs. 3, 4, 5, 11, 12, 13 and 16) as to form a fluidtight longitudinal conduit 101 in which there is a certain vacuum created by vacuum pump 136. It further comprises a certain number of cylindrical housings 102, suitably spaced from one another and adapted to receive hollow shafts 103 located at right angles to the axial longitudinal plane of the casing. Said shafts are fixed in position by screws 102'. On each of these shafts there is fitted the tubular extension 105 of a pulley 104 held in position with respect to said shaft by a screw 106 screwed in the end of a spindle 107 fixed in said shaft. The extension 105 of each pulley 104 is provided with a suitable gear 108 meshing with one of the two endless wheels 109, 109' carried by supports 110 provided with ball bearings 111. The endless screws, on which are keyed gear wheels 112, 112' (Fig. 16) are driven by electric motor 113 carried by a plate 85. These endless screws impart a suitable rotary movement to pulleys 104, 104'. The endless screws and the pinion 108, 108' with which they mesh are lubricated by means of secondary pinions 114, made of a suitable material and dipping in an oil bath 115, contained in a tank 116 placed at the lower part of supporting plate 85 and running over the whole length thereof. The oil is fed from a reservoir 117 through a gear pump 118 (Fig. 3) into a conduit 119 which conveys it to the place where it is to be used, and in particular lubricates the train of gears 112—120 placed in the casing and actuated by electric motor 113. By varying the gear ratios of the gear train 112—120, it is possible to vary the speed of revolution of the endless screws and therefore the speed of revolution of the driving pulleys according to the time necessary for each treatment. The extensions 105 of pulleys 104 (Figs. 4, 11, 12 and 16

13) all rotate at the same speed of revolution on shafts 103, which are provided each with a central conduit 122 closed at one end by the spindle 107 fixed therein. Each of these shafts is provided with a radial conduit 123 opening at one end into said conduit 122 and at the other end into a transversal peripheral recess 122'. The extension 105 of pulley 104 is provided with a certain number of conduits 124, 125 ... 133 opening into the inner cylindrical surface of said extension 105 at points thereof that are preferably distributed circularly opposite the transversal recess 123' of shaft 103. These conduits extend into pulley 2. They are connected with two sets of radial conduits 124', 125', ... 133' and 124'', 125'', ... 133'' (Figs. 11, 12 and 13) opening respectively into each of the two smooth marginal cylindrical portion of pulley 104 at points thereof that are preferably evenly distributed along said marginal surfaces. The transversal peripheral recess 123' of shaft 103 is of such a size that, at any time, it corresponds only with those of the conduits of the pulley whose suction orifices are in contact with film F.

The vacuum existing in main channel 101, connected through pipe 135 with vacuum pump 136 produces through conduit 134 a certain suction in the central conduit 122 of shaft 103. This suction is transmitted, through conduit 123 and recess 123', to a series of longitudinal conduits 124, 125, ... 128 connected to radial conduits 124', 125', ... 128' and 124'', 125'', ... 128'' opening into the cylindrical marginal surfaces of pulley 104 that are in contact with the edges of film F. This produces, along the whole active portion of the pulley that is in contact with the film a suction which determines a suitable adhesion of the film on the pulley that drives it in its rotary motion. This method of driving film has, by comparison with the ordinary methods by means of toothed wheels the teeth of which engage in perforations provided in the marginal portions of the film, the advantage of eliminating any risk of tearing the film in the course of the treatment, since it allows for a slight slipping of the film with respect to the pulley, without interrupting the connection.

This arrangement necessitates on the one hand a very accurate fitting of shaft 103 in cylindrical housing 102 and on the other hand a perfect fluidtightness between the outer peripheral surface of shaft 103 and the inner bearing surface of extension 104 of pulley 104. This fluidtightness is obtained by providing a plurality of grooves 137 in the outer surface of shaft 103, lubrication being ensured by means of a capillary device working under the effect of a slight suction. This capillary device consists of a tube 139 dipping in the oil 115 of an oil receptacle 116 and within which is disposed a flexible wick 138. Tube 139 is connected to a conduit 140 communicating on the one hand through holes 141 with grooves 137 and, on the other hand, through a small conduit 142, with the central conduit 122 of shaft 103. The partial vacuum existing in said conduit 122 therefore exerts a slight suction in the conduits connected with wick 138, and definitely ensures the upward movement of oil towards the parts to be lubricated. The excess of oil, if any, can eventually flow out through conduit 142 the cross section of which is then increased. This excess of oil will be utilized for lubricating the organs of the vacuum pump and for neutralizing the caustic effects of the liquids utilized for the treatment of the film on the metals of the different mechanical organs of the apparatus.

It should be noted that, for practical purposes, the various inner conduits are first drilled throughout the pulley and of its extension in order that the machining may be easier, the orifices thus made being subsequently stopped, for instance by soldering.

Figures 9, 10:
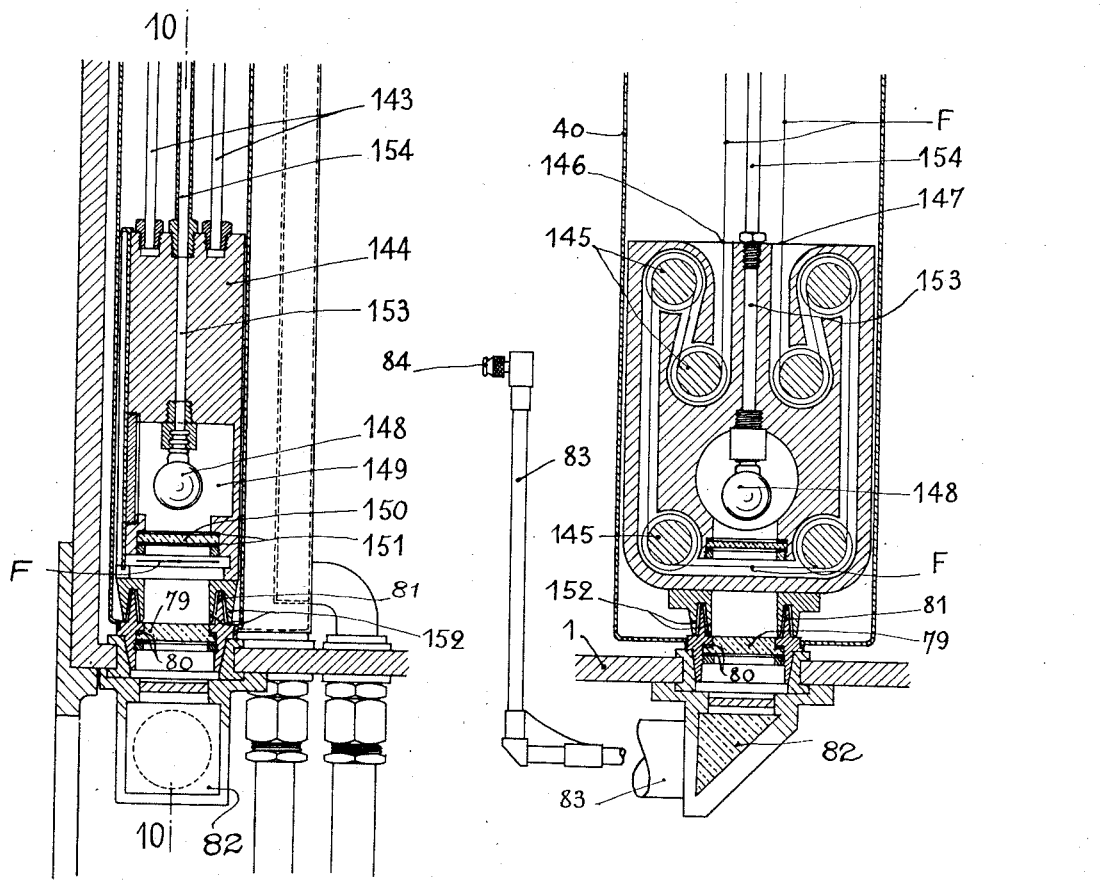
Fig. 9 is a sectional view on the line 9—9 of Fig. 3 showing on an enlarged scale the optical apparatus for examining the film that is being treated.
Fig. 10 is a sectional view on the line 10—10 of Fig. 9.

The supporting plate 85 further carries, opposite tank 40, (Figs. 3, 9, and 10) and through elastic suspension means, a portion 143 of which is shown in Fig. 9, the film illuminating device that is intended to cooperate with the periscopic system 82, 83, 84. This illuminating device consists of a box 144 in which a certain number of pulleys 145, mounted loose on their spindles, are so disposed as to cause the film to enter the box at 146 and to leave it at 147, passing, at the lower part of the box, immediately above window 79 in a position that permits the operator, placed at 84, to observe said film. Box 144 is so made that water can circulate therethrough around the film. The illuminating means proper consists of an electric bulb 148 placed in a fluidtight chamber 149 closed at the lower part by a translucent glass 150 with the interposing of suitable packings 151. This glass permits of evenly illuminating the surface of the film. A set of baffles 152 carried by box 144 is arranged to engage, when the lid is closed, on an annular flange 81 of the window and eliminates any risk of fogging the parts of the film that are being treated in other tanks of the apparatus. The wires feeding current to bulb 148 pass through a conduit 153 provided in box 144. A tube 154 carried by the suspension device 143 is screwed and soldered on the box so as to protect in a fluidtight manner the wires through which electric current is fed to bulb 148.

Casing 1 is provided, on one of its outer faces, with a board carrying a certain number of instruments, which may for instance comprise: a telephone 155, eventually with a loud speaker 156, through which the operator can communicate with the assistant chemist, who stays near the baths and the various mechanisms; a manometer 157 indicating the vacuum, a voltmeter for indicating the value of the rectified current, whereby it is possible to adjust the current in such manner that the various mechanisms work at a uniform speed, said speed being variable so that the time for which the baths act on the film can be modified by varying the rate of speed of the film; a switch 159 for controlling the vacuum pump; a main switch I; a switch 160 for controlling the lifting screws; a voltmeter 161 and an ammeter 162 for controlling the electric current; a switch 163 for controlling the transparency illumination of the instrument board; a switch 164 for controlling the device for illuminating the film; an aperture 84 for uncovering the eyepiece of the periscopic device; counters 165 and 166 connected with the unwinding reel and the winding reel respectively, for indicating the lengths of film in each magazine; clocks 167 and 168 provided with alarm devices for limiting the duration of certain operations; a thermometer 169 provided with a dial 169, which permits of controlling the temperature of the baths in which the film is treated; electric visual signals 170 which indicate the accidental stopping and the normal working of the liquids in the tanks; a thermometer having a dial 171 for controlling the temperature of the air present in the drying tank; a hygrometer 172 which indicates the limits of moisture in the drying tanks, and a wheel 173 for controlling the discharge valves.

The operation of the apparatus for the treatment of cinematographic films according to my invention is as follows:

Lid 3 being open as shown in Fig. 1, in order to permit of verifying for instance the good working state of the apparatus, the operator acts on switch 160 which controls the lifting screws, so that lid 3 is moved down and its baffles come into engagement with the baffles of the casing, perfect fluidtightness of the whole being ensured by means of packing 30. Door 11 of casing 1 is then opened and the apparatus is charged by inserting magazine 89 between the jaws 88. One end of the film is then inserted between rollers 93 and 94. Said end of the film is then fixed and glued to the operating film by means of fastening box 93. Door 11 is then closed, packed in such manner that light cannot leak in, and locked, so that the treatment of the film can take place in a closed receptacle. The apparatus is then started by the operator.

The operating film, one of the ends of which is wound about winding reel 91 and the other end of which is fixed, as above explained to the end of the film to be treated, occupies, at the start of the working, the whole of the apparatus. It passes first between pulleys 174 and 175 and then through the compartment in which the film is treated by chemical baths. The diagram of the passage of the film in this compartment is shown in elevation in Fig. 3 and in plan view in Fig. 16, the film passing alternately from one or several upper driving pulleys to a lower pulley mounted loose on its spindle and immersed in the corresponding bath. In the tank 40 that contains the optical apparatus for examining the film that is being treated, the film passes over pulleys 145 mounted loose on their spindles, as above explained.

After passing through the compartment in which the chemical treatment takes place (Fig. 16), the film is turned at right angles and then enters the drying compartment, being again turned at right angles before passing over the first driving pulley 104', so that it now moves in a direction exactly opposed to that in which it was moving in the compartment for the chemical treatment. The film moves in a manner similar to that above described through the drying compartment, and after passing from one or several driving pulleys to the corresponding lower pulley mounted loose on its spindle it reaches the winding reel 91. While moving through the drying compartment, the film has constantly its edges located opposite orifices 75, 76 (Fig. 14) and it is dried by the current of warm air that passes from one conduit to the symmetrical conduit.

This arrangement may advantageously be replaced by that shown in Fig. 15 in which the film F is twisted by 180° while passing from an upper pulley to the corresponding lower pulley. The arrangement of Fig. 15 has the further advantage of preventing any accidental injuring of the film the emulsion carrying face of which is always turned in the same direction, with respect to the pulley on which the film is wound.

Figs. 19 and 20 are perspective views showing the platform for visiting the apparatus in the lowered position and in the raised, or working, position, respectively. This device essentially comprises a platform 174 provided with an extension 175 hinged thereto. Platform 174 is connected to the basis of pedestal 2 by two pairs of connecting rods 176 and 177 pivoted about spindles 176' and 177' respectively, said spindles being rigidly carried by the platform and by pedestal 2 respectively. These two pairs of connecting rods are jointed by means of a pin 180 on which is journalled a bracing member consisting of two jointed levers 178–179. In the position shown in Fig. 19, the system of connecting rods and of jointed levers is folded inside the pedestal. In the position shown in Fig. 20, the platform is raised and the operator can utilize it for visiting easily all the parts of the apparatus.

While I have described what I deem to be preferred embodiments of my invention, it should be well understood that I do not wish to be limited as there might be changes made in the arrangement, disposition, and form of the parts, without departing from the principle of my invention as comprehended within the scope of the appended claims:

1. An apparatus for treating cinematographic and similar films, which comprises in combination, a casing impervious to light, a removable lid adapted to cover said casing in such manner that light cannot leak in, a plurality of partitions for dividing said casing into a certain number of compartments, a support for a film magazine and for a winding reel in one of said compartments, means for rotating said magazine and said reel, a plurality of tanks for the chemical treatment of the film in another compartment, means for feeding the baths to said tanks and discharging them therefrom, means for drying the film provided in another compartment, and means for moving the film forward from said magazine to said reel through said compartments.

2. An apparatus according to claim 1 further comprising mechanical means for moving the lid vertically with respect to said casing.

3. An apparatus according to claim 1 further comprising a plurality of baffles provided along the upper edge of said casing, a plurality of baffles provided along the edge of the lid so as to engage in the first mentioned baffles when the lid is closed, a packing in the space between two of the first mentioned baffles adapted to cooperate with one of the second mentioned baffles, whereby light cannot leak in through the joint between the casing and its lid, a sleeve rigidly fixed to each end of said lid and extending downwardly in said casing, said sleeve being inwardly screw-threaded, a screw vertically journalled in said casing and fitting in each of said sleeves, an electric motor and means for causing said electric motor to rotate said screws, whereby the lid can be moved vertically with respect to the casing.

4. An apparatus for treating cinematographic and similar films which comprises in combination, a casing impervious to light, a removable lid adapted to cover said casing in such manner that light cannot leak in, a plurality of partitions for dividing said casing into a certain number of compartments, a support for a film magazine and for a winding reel in one of said compartments, means for rotating said magazine and said reel, a plurality of tanks for the chemical treatment of the film in another compartment, means for feeding the baths to said tanks and discharging them therefrom, means for drying the film provided in another compartment, a row of upper pulleys disposed parallelly to each other in substantially the same horizontal plane in each of the two last mentioned compartments, means supported by the lid for driving said pulleys, a row of lower pulleys disposed parallelly to each other in substantially the same horizontal plane in each of the two last mentioned compartments, and means for elastically suspending said pulleys from said lid so that they can have slight vertical displacements, so that the film passes in a zig-zag fashion alternately on an upper pulley and a lower pulley.

5. An apparatus according to claim 4 further comprising suction means for applying the marginal edges of the film against the marginal surfaces of the driving pulleys.

6. An apparatus according to claim 1 comprising three transverse partitions two of which are located close to the ends of the casing, and a longitudinal partition extending between one of said two extreme transverse partitions and the third transverse partition, the tanks for the chemical treatment of the film and the means for drying the film being located on either side of said longitudinal partition respectively.

7. An apparatus for treating cinematographic and similar films according to claim 1 in which the means for feeding the baths to the tanks and discharging them therefrom comprise a feed tank, a chamber for adjusting the temperature of the bath connected to said feed tank, a pipe leading from said chamber to the top of the tank for the chemical treatment of the film, a siphon connected to the bottom of the tank for the chemical treatment of the film and the top of which is at the level at which it is desired to maintain the free surface of the liquid in said tank, a discharge pipe connected to the end of said siphon, a pipe connecting directly the bottom of the tank for the chemical treatment of the film to said discharge pipe, and a valve on said last mentioned pipe, said valve being normally closed so as to prevent the liquid from flowing directly from the tank for the chemical treatment of the film into said discharge pipe.

8. An apparatus for treating cinematographic and similar films according to claim 1 in which the means for feeding the baths to the tanks and discharging them therefrom comprise a feed tank, a chamber for regulating the temperature of the bath connected to said feed tank, a pipe leading from said chamber to the top of the tank for the chemical treatment of the film, a siphon connected to the bottom of said tank for the chemical treatment of the film and the top of which is at the level at which it is desired to maintain the free surface of the liquid in said tank, a discharge pipe connected to the lower end of said siphon, a pipe connecting directly the bottom of the tank for the chemical treatment of the film to the discharge pipe, a valve on said last mentioned pipe, said valve being normally closed so as to prevent the liquid from flowing directly from the tank for the chemical treatment of the film into said discharge pipe, at least one recuperation tank, a pump for forcing liquid from said discharge pipe into said recuperation tank, and means for transferring liquid from said recuperation tank into said feed tank.

9. An apparatus for treating cinematographic and similar films according to claim 1 in which the means for feeding the baths to the tanks and discharging them therefrom comprise a feed tank, a chamber for regulating the temperature of the bath connected to said feed tank, a pipe leading from said chamber to the top of the tank for the chemical treatment of the film, a siphon connected to the bottom of said tank for the chemical treatment of the film and the top of which is at the level at which it is desired to maintain the free surface of the liquid in said tank, a discharge pipe connected to the lower end of said siphon, a pipe connecting directly the bottom of the tank for the chemical treatment of the film to the discharge pipe, a valve on the last mentioned pipe, said valve being normally closed so as to prevent the bath from flowing directly from the tank for the chemical treatment of the film into said discharge pipe, two recuperation tanks, a pump for forcing the liquid from said discharge pipe into said recuperation tanks, a two-branched pipe between said pump and said tanks, a valve for directing the liquid from said pump into either of said recuperation tanks, a pump for forcing the liquid from said recuperation tanks into said feed tanks, a two-branched pipe connecting said recuperation tanks to the last mentioned pump, and a valve for connecting the liquid from either of said recuperation tanks into the last mentioned pump.

10. An apparatus for treating cinematographic and similar films according to claim 1 in which the means for feeding the bath to each tank and for discharging it therefrom comprise, a feed tank, a chamber for regulating the temperature of the bath connected to said feed tank, a pipe leading from said chamber to the top of the tank for the chemical treatment of the film, a siphon connected to the bottom of said tank for the chemical treatment of the film and the top of which is at the level at which it is desired to maintain the free surface of the liquid in said tank, a discharge pipe connected to the lower end of said siphon, a pipe connecting directly the bottom of the tank for the chemical treatment of the film to the discharge pipe, a valve on the last mentioned pipe, said valve being normally closed so as to prevent the bath from flowing directly from the tank for the chemical treatment of the film into said discharge pipe, and a single means for controlling the valves of a plurality of tanks for the chemical treatment of the film.

11. An apparatus for treating cinematographic and other films according to claim 1, further comprising a tank for washing the film located in one of said compartments, a window at the bottom of said tank, means for observing the under face of said window, a box carried by said lid opposite the last mentioned tank, means for causing the film to move forward through said box so that it passes directly above said window, said box being so shaped that water can flow therethrough around said film, said box being provided with a fluidtight chamber, a glass plate closing said chamber at the bottom thereof located immediately over said window and the portion of the film that is passing above said window, an electric bulb in said chamber, and fluidtight means for feeding current to said bulb.

12. An apparatus for treating cinematographic films according to claim 1, further comprising a tank for washing the film located in one of said compartments, a transparent window at the bottom of said tank, a periscopic tube opening at one end under said window and at the other end at the upper part of said casing so that it is possible to observe the under face of said window through said periscopic tube, a box carried by said lid opposite the last mentioned tank, means for causing the film to move forward through said box so that it passes directly above said window, said box being so shaped that water can flow therethrough around the film, said box being provided with a fluidtight chamber, a glass plate closing said chamber at the bottom thereof located immediately over said window and the portion of the film that is passing above said window, an electric bulb in said chamber, and fluidtight means for feeding current to said bulb, all the lighted portions of said tank being surrounded by joints such that light cannot leak through them to the portions of the film that are being treated.

13. An apparatus for treating cinematographic and similar films according to claim 1 in which the compartment containing the drying means comprises, upper and lower pulleys fixed to the lid and over which the film passes alternately in a zig-zag fashion, and a plurality of conduits located on either side of said film in the plane thereof, said conduits being provided with orifices for blowing air over the surface of the film, the conduits located on one side of the film being adapted to be fed with warm compressed air, and the conduits located on the opposite side of the film being connected with suction means.

14. An apparatus for treating cinematographic and similar films according to claim 1 in which the compartment that contains the film magazine is provided with at least one door for placing said magazine and removing the winding reel after the film has been treated.

RENÉ MARCON.